United States Patent
Kim

(10) Patent No.: US 11,251,599 B2
(45) Date of Patent: Feb. 15, 2022

(54) DC CIRCUIT BREAKER

(71) Applicant: HYOSUNG HEAVY INDUSTRIES CORPORATION, Seoul (KR)

(72) Inventor: Byoung Choul Kim, Incheon (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/961,060

(22) PCT Filed: Dec. 21, 2018

(86) PCT No.: PCT/KR2018/016411
§ 371 (c)(1),
(2) Date: Jul. 9, 2020

(87) PCT Pub. No.: WO2019/139276
PCT Pub. Date: Jul. 18, 2019

(65) Prior Publication Data
US 2020/0358280 A1    Nov. 12, 2020

(30) Foreign Application Priority Data

Jan. 11, 2018 (KR) .................. 10-2018-0003882

(51) Int. Cl.
*H02H 3/087* (2006.01)
*H01H 33/59* (2006.01)

(52) U.S. Cl.
CPC .......... *H02H 3/087* (2013.01); *H01H 33/596* (2013.01)

(58) Field of Classification Search
CPC ............................. H02H 3/087; H01H 33/596
See application file for complete search history.

(56) References Cited

U.S. PATENT DOCUMENTS

2014/0299579 A1* 10/2014 Hartmann .............. H02H 3/021
                                                    218/145
2016/0329179 A1* 11/2016 Kim ...................... H01H 9/542

FOREIGN PATENT DOCUMENTS

| JP | 2014-079121 A | | 5/2014 |
|---|---|---|---|
| KR | 10-2015-0078990 A | | 7/2015 |
| KR | 10-1630093 B1 | | 6/2016 |
| KR | 10-2016-0080017 A | | 7/2016 |
| KR | 10-2017-0142020 A | | 12/2017 |
| KR | 20180050886 A | * | 5/2018 |

OTHER PUBLICATIONS

Translation of KR-20180050886-A. May 16, 2018. (Year: 2018).*

* cited by examiner

*Primary Examiner* — Jared Fureman
*Assistant Examiner* — Christopher J Clark
(74) *Attorney, Agent, or Firm* — Novick, Kim & Lee, PLLC; Jae Youn Kim

(57) ABSTRACT

A DC circuit breaker capable of blocking a fault current flowing through a DC line when a fault occurs in the DC line is proposed. The DC circuit breaker includes a main switch connected to a first DC line at one end and connected to a second line at the other end; a first circuit unit connected in parallel to the main switch; and n second circuit units each connected in parallel to the main switch, wherein the first circuit unit is composed of a series connection of an inductor, a first capacitor and a first switch, the inductor or the first capacitor being connected to the first DC line and the first switch being connected to the second DC line.

10 Claims, 5 Drawing Sheets

DC CIRCUIT BREAKER

TECHNICAL FIELD

The present invention relates to a direct current (DC) circuit breaker, and more particularly, to a DC circuit breaker capable of blocking a fault current flowing through a DC line when a fault occurs in the DC line.

BACKGROUND ART

A high voltage DC circuit breaker is a switching device capable of blocking a current flowing through a transmission line for a high voltage of 50 kV or higher, such as a high voltage direct current (HVDC) system. Such a high voltage DC circuit breaker usually serves to block a fault current when a fault occurs on one side or the other side of a high voltage DC line. Of course, the DC circuit breaker may also be applied to a DC distribution system with an intermediate voltage of about 1 to 50 kV.

Generally, the DC circuit breaker is provided with a relatively inexpensive mechanical switch to disconnect the DC line to block the fault current by opening the mechanical switch when a fault occurs in the DC line.

However, when the mechanical switch is opened, an arc may occur between switching contacts due to a high voltage the mechanical switch. When the arc occurs, a fault current continuously flows through the arc, causing a problem that the fault current is not reliably blocked.

In order to solve this problem, Japanese Patent Application Publication No. 1984-068128 and Korean Patent No. 1183508 propose a technique to extinguish an arc by accomplishing a zero current in a mechanical switch by superimposing a resonant current in the opposite direction of a fault current flowing through the arc occurring in switching contacts of the mechanical switch when the mechanical switch is opened due to occurrence of a fault in a DC line.

In this case, the resonant current injected for arc extinguishing should have the same or larger magnitude than the fault current while flowing in the direction opposite to the fault current. However, the above-described conventional DC circuit breakers have problems in that a blocking speed is slowed because it is required to accomplish several resonances in order to generate a resonant current equal to or larger than the fault current and, in particular, when the fault current is large or when there is a change in the fault current, it is difficult to immediately cope with the fault current.

DISCLOSURE

Technical Problem

The present invention has been proposed to solve the problems of the prior art, and an object of the present invention is to provide a DC circuit breaker capable of rapidly injecting a resonant current equal to or larger than a fault current into a mechanical switch when the mechanical switch is opened in the DC circuit breaker.

In addition, another object of the present invention is to provide a DC circuit breaker capable of enables an immediate measure even when a fault current flowing through a mechanical switch is large or when there is a change in a fault current.

Technical Solution

According to an embodiment of the present invention, a DC circuit breaker includes a main switch connected to a first DC line at one end and connected to a second line at the other end; a first circuit unit connected in parallel to the main switch; and n second circuit units each connected in parallel to the main switch, wherein the first circuit unit is composed of a series connection of an inductor, a first capacitor and a first switch, the inductor or the first capacitor being connected to the first DC line and the first switch being connected to the second DC line, and each of the n ($n \geq 1$, integer) second circuit units is composed of a series connection of the second capacitor and the second switch, the second capacitor being connected to a common point between the first capacitor of the first circuit unit and the first switch and the second switch being connected to the second DC line.

According to the present invention, when the main switch is opened due to occurrence of a fault in the first DC line or the second DC line, one switch among the first switch of the first circuit unit and n second switches of the n second circuit units is turned on and the remaining switches are turned off.

According to the present invention, the switch to be turned on is determined among the first switch and the n second switches based on a magnitude of a fault current flowing through the main switch.

According to the present invention, the switch to be turned on is a relatively farther switch from the first circuit unit among the n second switches each connected in parallel to the first circuit unit selected sequentially as a magnitude of the fault current increases.

According to the present invention, the first switch and the second switch include a thyristor.

According to the present invention, the n second capacitors of the n second switch units have capacities equal to or at least partially equal to one another.

According to the present invention, the n second capacitors of the n second switch units have different capacities.

According to the present invention, when a fault occurs on a side of the first DC line, the main switch is opened, and a current by a voltage stored in the first capacitor through a first closed circuit of the main switch and the first circuit unit is supplied to the main switch in a direction opposite to the fault current.

According to the present invention, when the fault current is not blocked in the main switch after the current is supplied to the main switch in the opposite direction through the first closed circuit, the first switch is turned off, a first switch of the n second switches is turned on, and remaining switches are turned off, a current by charging voltages of capacitors included in a second closed circuit formed through the first switch which is turned on is supplied to the main switch in a direction opposite to the fault current.

According to the present invention, when the fault current is not blocked in the main switch after the current is supplied to the main switch in the opposite direction through the second closed circuit, the n second switches are sequentially turned on from the first switch to an n-th switch of the n second switches and the remaining switches are turned off in a state in which the first switch is in an off state and a current by charging voltages of capacitors included in a third closed circuit formed through the second switch which is turned on whenever the one of the second switches is turned on is supplied to the main switch in a direction opposite to the fault current, until zero current is achieved between the two switching contacts.

According to the present invention, when a fault occurs on a side of the first DC line, the second switch to be turned on is determined such that a current by charging voltages of capacitors included in a fourth closed circuit formed through the second switch is to be turned on is larger than a fault current of the main switch when the main switch is opened, and the second switch to be turned on selected from the n second circuit units is turned on, remaining second switches and the first switch (S0) are turned off.

According to the present invention, the DC circuit breaker may further include a charging resistor connected between a common point between an n-th capacitor and an n-th switch of a last second circuit unit of the n second circuit units and ground, wherein, when a current is supplied to the first DC line, the current flows through the inductor, the first capacitor of the first circuit unit, the n capacitors of the n second circuit units and the charging resistor to cause a voltage to be stored in the first capacitor and the n capacitors.

Advantageous Effects

According to the present invention, since a resonant circuit that generates a resonant current can be set and selected in various ways, a resonant current corresponding to a fault current occurring in a mechanical switch can be rapidly generated, and thus a fault current can be quickly blocked.

In addition, according to the present invention, since the magnitude of the fault current is detected even when the fault current is large or the fault current is changed, a resonant circuit corresponding to the fault current can be immediately generated, so that an immediate measure is possible.

MODE FOR INVENTION OR BEST MODE

Figure 1:
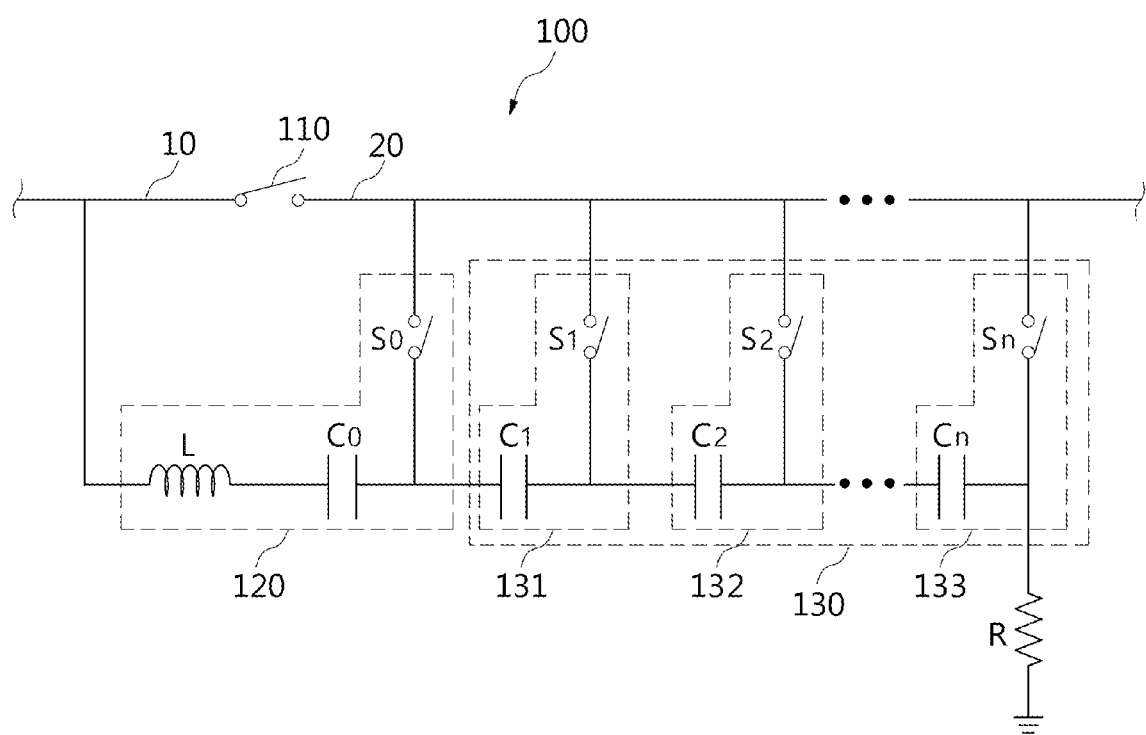
FIG. 1 is a configuration diagram of a DC circuit breaker according to an embodiment of the present invention.

Hereinafter, embodiments of the present disclosure will be described in detail with reference to the exemplary drawings. In adding reference numerals to the components of each drawing, it should be noted that the same reference numerals are assigned to the same components as much as possible even though they are shown in different drawings. In addition, in describing the embodiment of the present invention, if it is determined that the detailed description of the related known configuration or function interferes with the understanding of the embodiment of the present invention, the detailed description thereof will be omitted.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. It should be noted that if it is described in the specification that one component is "connected," "coupled" or "joined" to another component, the former may be directly "connected," "coupled," and "joined" to the latter or "connected", "coupled", and "joined" to the latter via another component.

FIG. 1 is a configuration diagram of a DC circuit breaker according to an embodiment of the present invention. Referring to FIG. 1, a DC circuit breaker 100 according to an embodiment of the present invention includes a main switch 110. The main switch 110 is preferably a mechanical switch.

One end of the main switch 110 is connected to a first DC line 10 and the other end is connected to a second DC line 20. The first and second DC lines 10 and 20 conduct a high-voltage current in both directions. When the main switch 110 is in a normal state, the main switch 110 is maintained in a closed state to transmit a current supplied through the first DC line 10 to the second DC line 20.

In this case, since a fault current flows from the first DC line 10 side to a load through the second DC line 20 when a fault occurs on the side of the second DC line 20, the main switch 110 is switched to an opened state to block the fault current to disconnect the first and second DC lines 10 and 20 from each other. The operation of the main switch 110 is controlled by a control unit (not shown).

In addition, the DC circuit breaker 100 includes a first circuit unit 120 connected in parallel to the main switch 110. The first circuit unit 120 is composed of the series connection of an inductor L, a first capacitor C0 and a first switch S0, and the inductor L or the first capacitor C0 is connected to the first DC line 10 and the first switch S0 is connected to the second DC line 20. That is, in the drawing, for example, the inductor L is illustrated as being connected to the first DC line 10, and the first capacitor C0 may be connected to the first DC line 10.

In this case, when the first switch S0 is turned on in a state in which the main switch 110 is closed, the main switch 110, the inductor L, the first capacitor C0, and the first switch S0 constitute a first closed circuit and the inductor L and the first capacitor C0 constitute an LC resonant circuit. Accordingly, in some cases, a current by a voltage stored in the first capacitor C0 may flow through the first closed circuit.

In addition, the DC circuit breaker 100 includes n (n≥1, integer) second circuit units 130 each connected in parallel to the first circuit unit 120. Each of the n second circuit units 120 is composed of the series connection of the second capacitor and the second switch, and the second capacitor has a common point between the first capacitor C0 and the first switch S0 of the first circuit unit 120 and the second switch is connected to the second DC line 20.

The second circuit unit 130 will be described in detail with reference to the drawings. The n second circuit units 130 each are connected in parallel to the first circuit 120, and the series connection 131 of the first capacitor C1 and the first switch S1 of the second circuit unit 130 is connected in parallel to the first circuit unit 120. Similarly, each of the series connection from the series connection 132 of the second capacitor C2 and the second switch S2 to the series connection 133 of the n-th capacitor Cn and the n-th switch Sn is connected in parallel to the first circuit unit 120.

As shown in the figure, the first switch S0 of the first circuit unit 120 and n second switches S1 to Sn of the second circuit unit 130 are all connected to the second DC line 20 at one ends and respectively connected to common points N1 to Nn between the first capacitor C0 and n second capacitors C1 to Cn at the other ends.

Specifically, the other end of the first switch S0 of the first circuit unit 120 is connected to the common point N1 of the first capacitor C0 and the first capacitor C1 of the second circuit unit 130, and the other end of the first switch S1 of the second circuit unit 130 is connected to the common point N2 between the first capacitor C1 and the second capacitor C2 of the second circuit unit 130.

The connection relationship of the switches S1 to Sn is applied in the same way to the first to the n-th as described above, and the other end of the k-th (1≤k≤n) switch Sk of the second circuit unit 130 is connected to the common point Nk between the k-th capacitor Ck and the (k+1)-th capacitor Ck+1. In this case, the last n-th switch Sn is connected to the common point Sn of the n-th capacitor Cn and the ground GND.

In addition, the DC circuit breaker 100 of the present invention further includes a charging resistor R connected between ground GND and the common point Nn of the last n-th capacitor and the n-th switch of the n second circuit units 130. The charging resistor is for charging the first capacitor C0 and the n second capacitors C1 to Cn by the current flowing through the first DC line 10.

Accordingly, when the current is supplied to the first DC line 10, the current flows through to inductor L, the first capacitor C0 of the first circuit unit 120, the capacitors C1 to Cn of the n second circuit units 130, and the charging resistor to cause the first capacitor to the first capacitor C0 and the n capacitors C1 to Cn to be charged with a voltage.

In the DC circuit breaker 100 according to the present invention, the charging capacity of the first capacitor C0 of the first circuit unit 130 may be equal to, at least partially equal to, or different from that of the second capacitors C1 to Cn of the n second circuit units 130. When the charging capacities are different from each other, when the n second circuit units 130 are sequentially connected in parallel to the first circuit unit 110 from the first second circuit unit to the n-th second circuit unit, it is preferable that the charging capacity increases as it goes from the first second circuit unit to the n-th second circuit unit.

In addition, in the DC circuit breaker 100 according to the present invention, when the main switch 110 is opened due to occurrence of a fault in the first DC line 10 or the second DC line 20, only one of the first switch S0 of the first circuit unit 120 and the second switches S1 to Sn of the n second circuit units 130 is turned on, and the remaining switches are turned off. Here, the on state of the switch means that the switch is in a closed state to conduct the current, and the off state of the switch means that the switch is in an opened state to block the current.

In this case, one of the first switch S0 and the second switches S1 to Sn is determined to be turned on according to the magnitude of the fault current flowing through the main switch 110. In particular, the larger the magnitude of the fault current, the relatively farther switch is turned on, among the first to n-th second switches S1 to Sn of the n second circuit units 130 sequentially connected in parallel to the first circuit unit 120, individually.

The reason for this is that, as the larger the fault current, the second switch that is further away from the first circuit unit 120 is turned on and the remaining second switches are turned off to block the fault current by using a larger charging voltage from the first capacitor C0 to the second capacitor of the second switch which is turned on.

Figure 2:
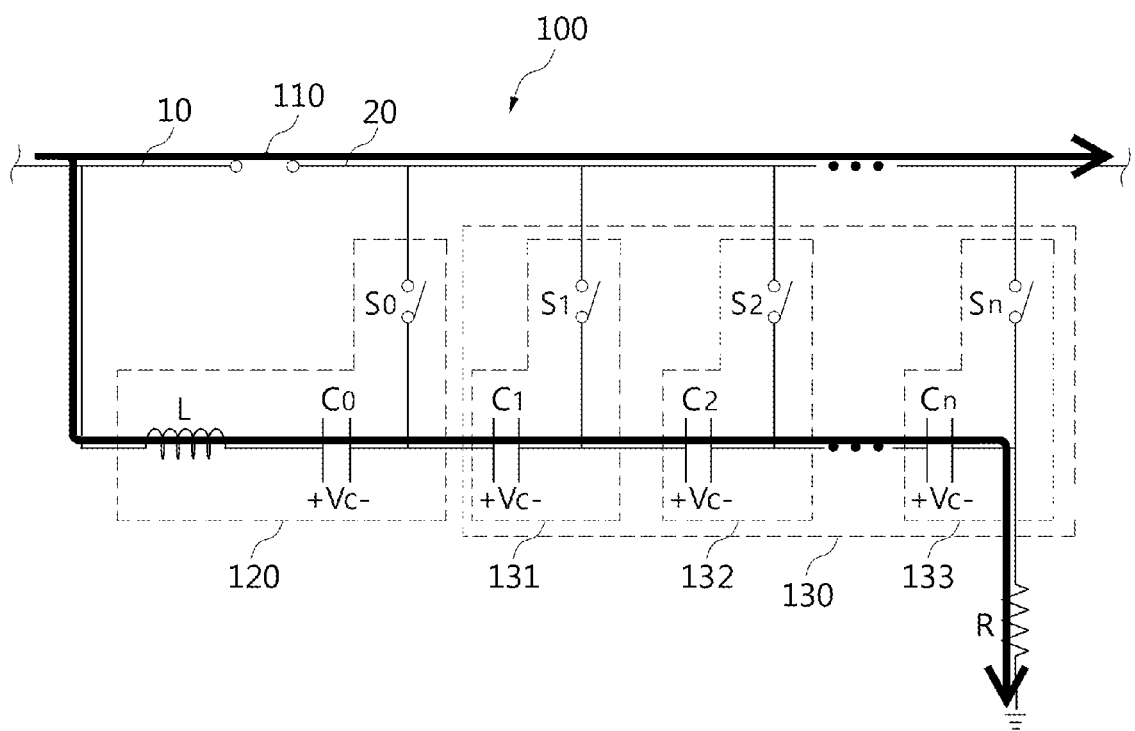
FIG. 2 is a schematic diagram showing a current flow when the DC circuit breaker according to an embodiment of the present invention is in a normal state.

FIG. 2 is a schematic diagram showing a current flow when the DC circuit breaker according to an embodiment of the present invention is in a normal state. Referring to FIG. 2, the DC circuit breaker 100 according to the present invention maintains a closed state in a normal state. In this case, all switches, that is, the first switch S0 and the n second switches S1 to Sn are all turned off.

Accordingly, a normal current is supplied through the first DC line 10 to normally flow through the main switch 110 to the second DC line 20, and at the same time, the current flows through the inductor L, the first capacitor C0, the n second capacitors C0 to Cn, and the resistor R to cause the capacitors C0 to Cn to be charged to +Vc voltage, individually. In this case, specific voltages are stored according to the charging capacities of the capacitors C0 to Cn.

Figure 3:
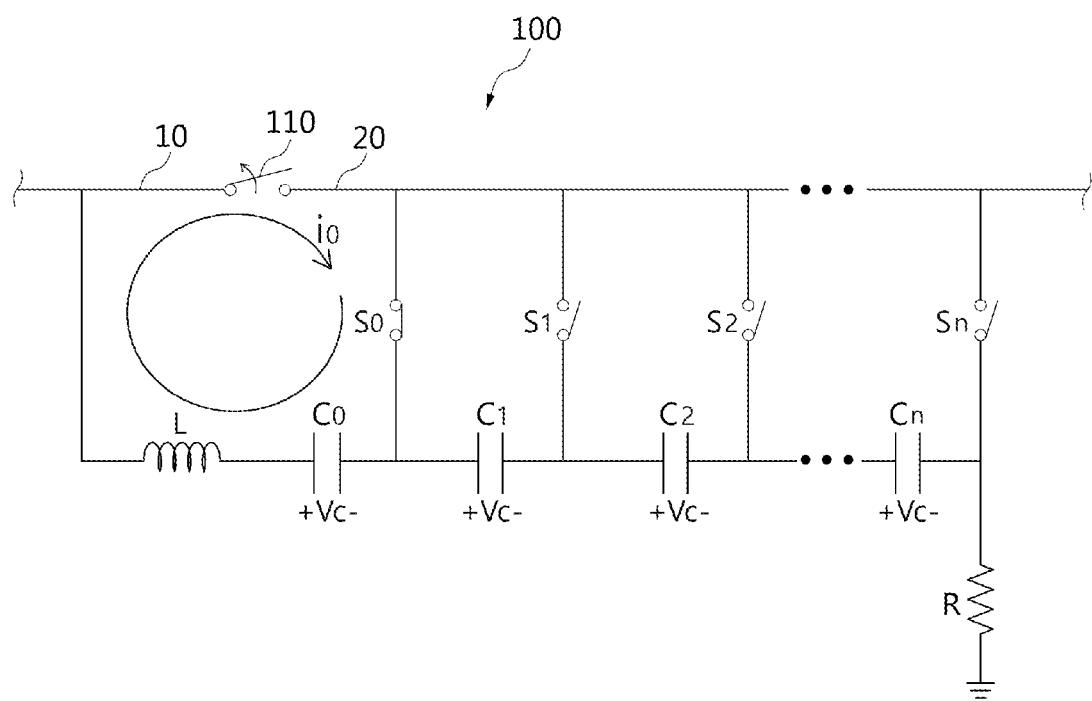
FIG. 3 is a schematic diagram showing a process of breaking a fault current when a fault occurs on one side of a DC circuit breaker according to an embodiment of the present invention.
Figure 4:
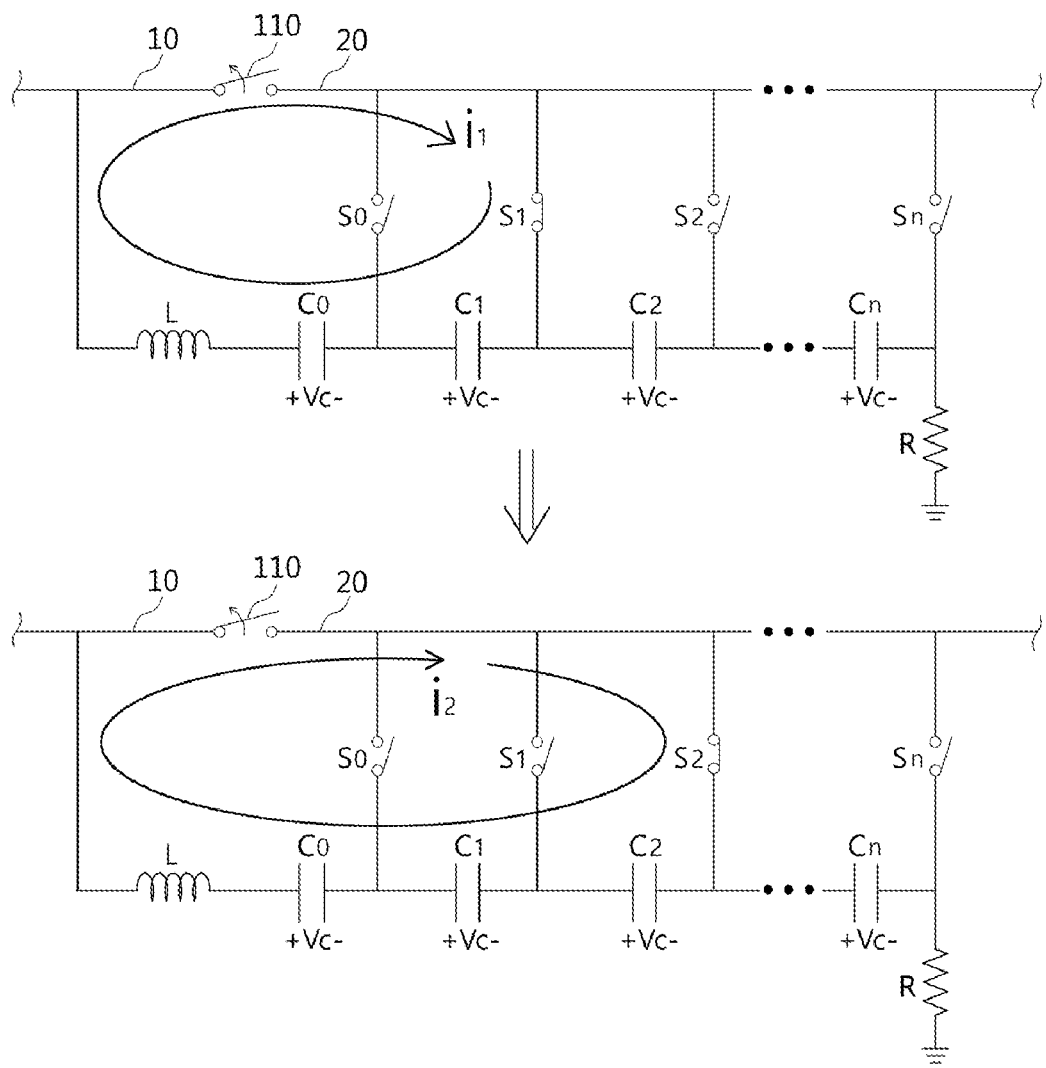
FIG. 4 is a schematic diagram showing a process of breaking a fault current when a fault occurs on one side of a DC circuit breaker according to another embodiment of the present invention.
Figure 5:
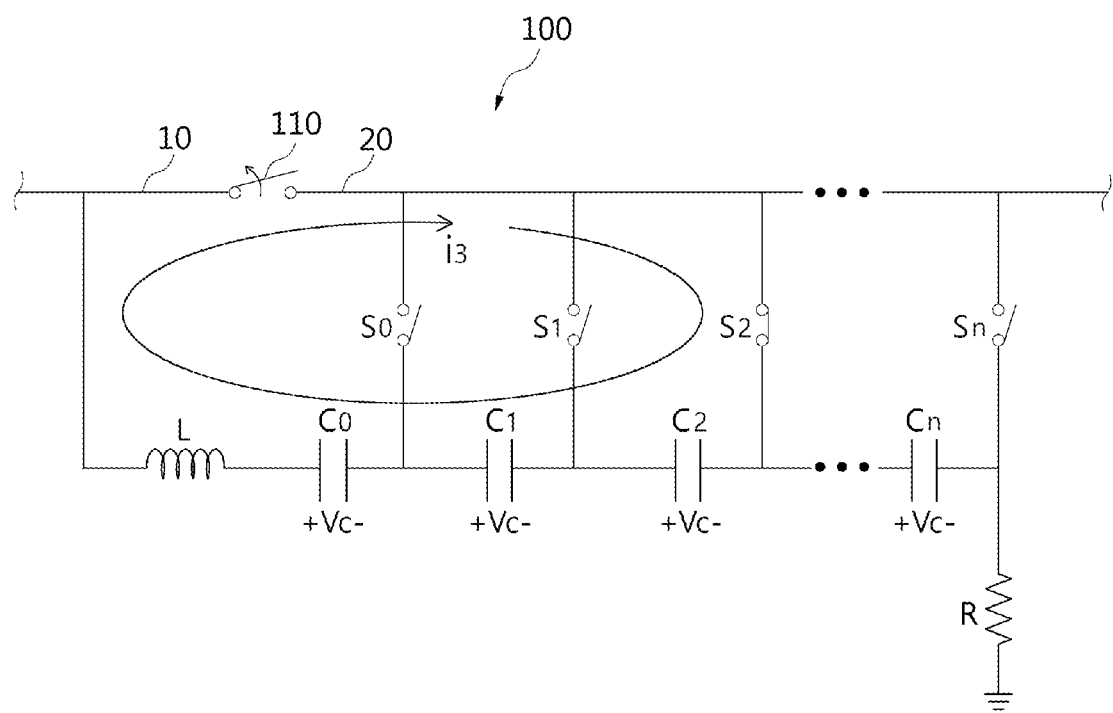
FIG. 5 is a schematic diagram showing a process of breaking a fault current when a fault occurs on one side of a DC circuit breaker according to still another embodiment of the present invention.

In this state, when a fault occurs on the first DC line 10 side, switches operates according to the embodiments of FIGS. 3 to 5 to block a fault current. This will be described in detail below.

FIG. 3 is a schematic diagram showing a process of breaking a fault current when a fault occurs on one side of a DC circuit breaker according to an embodiment of the present invention, FIG. 4 is a schematic diagram showing a process of breaking a fault current when a fault occurs on one side of a DC circuit breaker according to another embodiment of the present invention, and FIG. 5 is a schematic diagram showing a process of breaking a fault current when a fault occurs on one side of a DC circuit breaker according to still another embodiment of the present invention.

First, in the normal state of FIG. 2, when a fault occurs on the first DC line 10 side, the control unit (not shown) detects the occurrence of the fault and opens the main switch 110 of the DC circuit breaker 100 to block a fault current on the first DC line 10 as shown in FIG. 3. The main switch 110 is preferably a mechanical switch, but the present invention is not limited thereto. When the main switch 110 is opened, an arc may occur between switching contacts, and a fault current continuously flows from the second DC line 20 side to the first DC line 10 side.

In order to block such a fault current, the control unit turns on the first switch S0 of the first circuit unit 120 and turns off all the n second switches S1 to Sn. Accordingly, a first closed circuit L1 through the main switch 110 and the first circuit unit 120 is formed. Then, a current i0 caused by the +Vc voltage stored in the first capacitor C0 flows to the main switch 110 through the first closed circuit L1.

As described above, the direction of the current i0 supplied to the main switch 110 through the first closed circuit L1 is opposite to a direction of the fault current flowing from the second DC line 20 to the first DC line 10, and when the magnitude of the current i0 is at least equal to or larger than the fault current, the fault current in the main switch 110 is blocked.

When, as in FIG. 3, the fault current is larger than the magnitude of the current i0 supplied through the first closed circuit L1, the fault current is not completely blocked. In this case, the second circuit unit 130 is used as shown in FIG. 4.

In the example of FIG. 4, when a fault current is not blocked because it does not become 0 (zero) current in the main switch 110 even after supplying the current i0 in the opposite direction to the fault current through the first closed circuit L1 as shown in FIG. 3 above, as shown in (a), the first switch S0 in the on state is switched to an off state, the first switch S1 of the n second switches S1 to Sn is turned on, and the remaining switches S2 to Sn are turned off, so that the current i1 caused by the charging voltage of all the capacitors included in the second closed circuit L2 formed through the first switch S1 which is turned on is supplied to the main switch 110 in the opposite direction to the fault current.

The second closed circuit L2 is formed through the main switch 110, the inductor L, the first capacitor L0, and the first switch C1 and the first switch S1 of the second circuit unit 130, and the current i1 caused by the voltage stored in the first capacitor C0 and the first capacitor C1 is supplied to the main switch 110 in the opposite direction to the fault current through the second closed circuit L1.

When the fault current is not blocked even when the current i1 is supplied through the second closed circuit L2, the n second switches S1 to Sn are sequentially turned on from the first switch to the n-th switch and the remaining switches are turned off while the first switch S0 is maintained in an off state until the fault current is blocked completely as shown in (b), and the current i2 caused by the charging voltage of all the capacitors included in a third closed circuit formed through the second switch which is turned on whenever the one of the second switches S1 to Sn is turned on is supplied to the main switch 110 in the opposite direction to the fault current.

The n switches S1 to S2 of the second circuit unit are sequentially turned on one at a time until the fault current is blocked, and whenever one of the switches is turned on, the remaining switches are turned off to change the closed circuit sequentially. The change of the closed circuit is to sequentially increase the number of capacitors included in the closed circuit one at a time. As the number of capacitors increases, the magnitude of the current (i2, i3, i4, . . . in) supplied to the main switch 110 also increases, so that the fault current can be removed.

FIG. 5 shows an embodiment of detecting the magnitude of the fault current in advance and correspondingly select one of the second switches S1 to Sn to turn on the selected switch. In the normal state of FIG. 2, the control unit (not shown) first opens the main switch 110 of the DC circuit breaker 100 to detect the occurrence of a fault and block the fault current. In addition, after identifying the magnitude of the fault current, the control unit determines which of the n second switches S1 to Sn is to be turned on. That is, it is necessary to select a second switch which is to be turned on by determining whether the current i3 due to the voltages of all capacitors included in the closed circuit formed through the second switch, which is turned on, is larger than a fault current. Of course, in this case, all other switches are turned off.

As described above, it is preferable to determine a second switch such that the current i3 by the charging voltages of all capacitors included in the fourth closed circuit formed through the second switch, which is turned on, is larger than a fault current of the main switch 110 in the DC circuit breaker 100, when the main switch 110 is opened due to occurrence of a fault on the first DC line 10 side, and the second switch of one second circuit unit selected from the n second circuit units 130 is turned on and the remaining second switch(s) and the first switch S0 are turned off.

Accordingly, FIG. 5 shows an example in which the second switch S2 is turned on among the n second circuit units 130 for convenience of description. The remaining switches S0, S1, S3, . . . Sn are all turned off. Therefore, the main switch 110, the first capacitor C0 of the first capacitor C1, the second capacitor C2, and the second switch S2 of the n second circuit units 130 may form a fourth closed circuit L4.

Then, the current due to the voltage stored in the first capacitor C0 and the first and second capacitors C1 and C2 flows to the main switch 110 through the fourth closed circuit L4, thereby blocking the fault current.

When a larger current is required to block the fault current, a third, fourth, or subsequent switch is selected accordingly and is turned on. Then, since the voltage of the capacitors when the third, fourth, or subsequent switches are turned on is larger than a case where the second switch is turned on, a larger current can be obtained.

As described above, in the case of supplying a current in the opposite direction to the fault current to block the fault current generated in the main switch, the DC circuit breaker according to the present invention adjusts the magnitude of a current to be supplied according to the magnitude of the fault current. To this end, a number of switches and capacitor circuits are added to adjust the magnitude of the current by turning on/off the switches.

Through this operation, even when the fault current occurs in the main switch is large or the fault current fluctuates, the fault can be appropriately blocked.

In the above description, although it is described that all the components constituting the embodiment of the present invention are integrally combined or operated in combination, the present invention is not necessarily limited to such an embodiment. That is, within the scope of the present invention, all of the components may be operated in at least one selective combination. In addition, the terms "comprise", "constitute", or "have" described above mean that corresponding components may be included unless specifically stated otherwise. Accordingly, it should be construed that other components are not excluded, but may further be included. All terms including technical and scientific terms have the same meanings as commonly understood by those skilled in the art unless otherwise defined. Such terms as those defined in a generally used dictionary are to be interpreted as having meanings equal to the contextual meanings in the relevant field of art, and are not to be interpreted as having ideal or excessively formal meanings unless clearly defined as having such in the present invention.

The above description is merely illustrative of the technical idea of the present invention, and various modifications and variations may be made without departing from the essential characteristics of the present invention by those skilled in the art to which the present invention pertains. Accordingly, the embodiment disclosed in the present invention is not intended to limit the technical idea of the present invention but to describe the present invention, and the scope of the technical idea of the present invention is not limited by the embodiment. The scope of protection of the present invention should be interpreted by the following claims, and all technical ideas within the scope equivalent thereto should be construed as being included in the scope of the present invention.

The invention claimed is:

1. A DC circuit breaker comprising:
   a main switch connected to a first DC line at one end thereof and connected to a second line at another end thereof;
   a first circuit unit connected in parallel to the main switch; and
   n second circuit units each connected in parallel to the main switch,
   wherein n is an integer greater than or equal to 1,
   wherein the first circuit unit is composed of a series connection of an inductor, a first capacitor and a first switch, the inductor or the first capacitor being connected to the first DC line and the first switch being connected to the second DC line, wherein each of the n second circuit units is composed of a series connection of a second capacitor and a second switch, the second capacitor being connected to a common point between the first capacitor of the first circuit unit and the first switch and the second switch being connected to the second DC line, wherein, when a fault occurs on a side of the first DC line, the main switch is opened, and a current by a voltage stored in the first capacitor through a first closed circuit of the main switch and the first circuit unit is supplied to the main switch in a direction opposite to a fault current, and wherein, when the fault current is not blocked in the main switch after the current is supplied to the main switch in the opposite direction through the first closed circuit, the first switch is turned off, a first switch of the n second switches is turned on, and the remaining switches are turned off, a current by charging voltages of capacitors included in a second closed circuit formed through the first switch of the n second switches which is turned on is supplied to the main switch in the direction opposite to the fault current.

2. The DC circuit breaker of claim 1, wherein, when the main switch is opened due to occurrence of the fault in the first DC line or the second DC line, one switch among the first switch of the first circuit unit and n second switches of the n second circuit units is turned on and the remaining switches are turned off.

3. The DC circuit breaker of claim 2, wherein the switch to be turned on is determined among the first switch and the n second switches based on a magnitude of the fault current flowing through the main switch.

4. The DC circuit breaker of claim 3, wherein the switch to be turned on is a relatively farther switch from the first circuit unit among the n second switches each connected in parallel to the first circuit unit selected sequentially as a magnitude of the fault current increases.

5. The DC circuit breaker of claim 1, wherein the first switch and the second switch include a thyristor.

6. The DC circuit breaker of claim 1, wherein the n second capacitors of the n second switch units have capacities equal to or at least partially equal to one another.

7. The DC circuit breaker of claim 1, wherein the n second capacitors of the n second switch units have different capacities.

8. The DC circuit breaker of claim 1, wherein, when the fault current is not blocked in the main switch after the current is supplied to the main switch in the opposite direction through the second closed circuit, the n second switches are sequentially turned on from the first switch to an n-th switch of the n second switches and the remaining switches are turned off in a state in which the first switch is in an off state and a current by charging voltages of capacitors included in a third closed circuit formed through the second switch which is turned on whenever the one of the second switches is turned on is supplied to the main switch in the direction opposite to the fault current, until zero current is achieved between the two switching contacts.

9. The DC circuit breaker of claim 1, wherein when the fault occurs on the side of the first DC line, the second switch to be turned on is determined such that a current by charging voltages of capacitors included in a fourth closed circuit formed through the second switch to be turned on is larger than a fault current of the main switch when the main switch is opened, and the second switch to be turned on selected from the n second circuit units is turned on, the remaining second switches and the first switch are turned off.

10. The DC circuit breaker of claim 1, further comprising a charging resistor connected between a common point between an n-th capacitor and an n-th switch of a last second circuit unit of the n second circuit units and ground, wherein, when a current is supplied to the first DC line, the current flows through the inductor, the first capacitor of the first circuit unit, the n capacitors of the n second circuit units and the charging resistor to cause a voltage to be stored in the first capacitor and the n capacitors.

* * * * *